United States Patent
Ledsham et al.

(10) Patent No.: US 7,260,078 B1
(45) Date of Patent: Aug. 21, 2007

(54) METHOD AND SYSTEM FOR PROVIDING MANAGEMENT PROTOCOL MEDIATION IN WIRELESS COMMUNICATIONS NETWORKS

(75) Inventors: Stephen Ledsham, Colorado Springs, CO (US); Abid Inam, Colorado Springs, CO (US)

(73) Assignee: Siemens Aktiengesellschaft, München ( * ) Notice: Subject to any disclaimer, the term of this patent is extended or adjusted under 35 U.S.C. 154(b) by 0 days.

(21) Appl. No.: 09/499,922

(22) Filed: Feb. 8, 2000

(51) Int. Cl.
*H04L 12/28* (2006.01)
*H04L 12/66* (2006.01)
*H04Q 7/24* (2006.01)
*G06F 15/173* (2006.01)

(52) U.S. Cl. ............ 370/338; 370/401; 370/466; 455/426.1; 455/553.1; 709/223; 709/230

(58) Field of Classification Search ........ 370/328, 370/327, 338, 349, 352, 401, 465, 466, 467, 370/310, 310.1, 329, 389, 395.1; 455/450, 455/509, 426.1, 553.1; 379/426.1, 432.2, 379/553.1, 554.1, 555; 709/223, 230, 249
See application file for complete search history.

(56) References Cited

U.S. PATENT DOCUMENTS

| | | | |
|---|---|---|---|
| 4,680,786 A | 7/1987 | Baker et al. | 455/461 |
| 4,737,978 A | 4/1988 | Burke et al. | 455/438 |
| 4,775,999 A | 10/1988 | Williams | 455/435 |
| 4,980,907 A | 12/1990 | Raith et al. | 455/465 |
| 5,079,765 A | 1/1992 | Nakamura | 370/401 |
| 5,235,632 A | 8/1993 | Raith | 455/449 |
| 5,259,017 A | 11/1993 | Langmantel | 455/555 |
| 5,353,331 A | 10/1994 | Emery et al. | 455/461 |
| 5,440,613 A | 8/1995 | Fuentes | 455/436 |
| 5,446,736 A | 8/1995 | Gleeson et al. | |
| 5,448,619 A | 9/1995 | Evans et al. | 455/426 |
| 5,463,623 A | 10/1995 | Grimes et al. | 370/466 |
| 5,475,681 A | 12/1995 | White et al. | 370/349 |
| 5,475,689 A | 12/1995 | Kay et al. | 370/337 |
| 5,483,524 A | 1/1996 | Lev et al. | |
| 5,506,887 A | 4/1996 | Emery et al. | 455/461 |

(Continued)

FOREIGN PATENT DOCUMENTS

EP    0 944 203 A2    9/1999

(Continued)

OTHER PUBLICATIONS

Newton, Harry, "Newton's Telecom Dictionary, 13$^{th}$ Edition", 1998, Telecom Books and Flatiron Publishing, pp. 702-703.*

(Continued)

*Primary Examiner*—Alpus H. Hsu (57) ABSTRACT

A system for providing management protocol mediation between wireless networks includes a first wireless network (10) operable to communicate with a mobile station (12) over a wireless interface (48). The system also includes a second wireless network (44) having an operations and maintenance center (OMC) (78) coupled thereto and operable to execute an application to manage the first wireless network (10) using a first management protocol. The OMC (78) is further operable to manage the second wireless network (44) using a second management protocol. The system further includes a protocol mediator (166) coupled to the first and second wireless networks. The protocol mediator (166) is operable to translate between the first management protocol and the second management protocol.

21 Claims, 5 Drawing Sheets

U.S. PATENT DOCUMENTS

| | | | | |
|---|---|---|---|---|
| 5,537,610 | A | 7/1996 | Mauger et al. | 455/414 |
| 5,555,260 | A | 9/1996 | Rinnback et al. | |
| 5,555,269 | A | 9/1996 | Friday, Jr. et al. | |
| 5,579,384 | A | 11/1996 | Seymour | 379/243 |
| 5,602,843 | A | 2/1997 | Gray | 370/338 |
| 5,604,737 | A | 2/1997 | Iwami et al. | 370/352 |
| 5,608,786 | A | 3/1997 | Gordon | |
| 5,610,910 | A | 3/1997 | Focsaneanu et al. | |
| 5,610,974 | A | 3/1997 | Lantto | 455/433 |
| 5,613,100 | A | 3/1997 | Anezaki | 710/65 |
| 5,629,974 | A | 5/1997 | Rajala et al. | 455/466 |
| 5,636,218 | A | 6/1997 | Ishikawa et al. | 370/401 |
| 5,642,356 | A | 6/1997 | Wenk | |
| 5,652,787 | A | 7/1997 | O'Kelly | 379/114.01 |
| 5,655,001 | A | 8/1997 | Cline et al. | 370/328 |
| 5,664,005 | A | 9/1997 | Emery et al. | 455/422 |
| 5,666,399 | A * | 9/1997 | Bales et al. | 379/419 |
| 5,713,073 | A | 1/1998 | Warsta | 455/524 |
| 5,715,394 | A | 2/1998 | Jabs | 709/223 |
| 5,717,747 | A | 2/1998 | Boyle, III et al. | |
| 5,726,979 | A | 3/1998 | Henderson et al. | 370/254 |
| 5,734,699 | A | 3/1998 | Lu et al. | 455/422 |
| 5,740,374 | A | 4/1998 | Raffali-Schreinemachers | 709/238 |
| 5,742,596 | A | 4/1998 | Baratz et al. | 370/356 |
| 5,742,762 | A * | 4/1998 | Scholl et al. | 709/200 |
| 5,742,905 | A | 4/1998 | Pepe et al. | 455/461 |
| 5,754,539 | A | 5/1998 | Metz et al. | 370/349 |
| 5,764,955 | A | 6/1998 | Doolan | 709/223 |
| 5,771,275 | A | 6/1998 | Brunner et al. | 370/385 |
| 5,771,465 | A | 6/1998 | Böjeryd | 455/554 |
| 5,781,547 | A | 7/1998 | Wilson | 370/352 |
| 5,790,548 | A | 8/1998 | Sistanizadeh et al. | |
| 5,793,762 | A | 8/1998 | Penners et al. | 370/389 |
| 5,794,009 | A | 8/1998 | Coleman et al. | 710/15 |
| 5,796,727 | A | 8/1998 | Harrison et al. | |
| 5,796,772 | A | 8/1998 | Smith et al. | |
| 5,799,153 | A | 8/1998 | Blau et al. | 709/223 |
| 5,799,250 | A | 8/1998 | Veloso et al. | 455/422 |
| 5,809,028 | A | 9/1998 | Nethercott et al. | 370/467 |
| 5,818,824 | A | 10/1998 | Lu et al. | 370/328 |
| 5,818,915 | A | 10/1998 | Hayes, Jr. et al. | |
| 5,822,569 | A | 10/1998 | McPartlan et al. | 703/21 |
| 5,839,067 | A | 11/1998 | Jonsson | 455/422 |
| 5,845,211 | A | 12/1998 | Roach, Jr. | |
| 5,862,134 | A | 1/1999 | Deng | 370/352 |
| 5,862,208 | A | 1/1999 | MeLampy et al. | |
| 5,862,481 | A * | 1/1999 | Kulkarni et al. | 455/432.2 |
| 5,867,494 | A | 2/1999 | Krishnaswamy et al. | |
| 5,870,677 | A | 2/1999 | Takahashi et al. | 455/463 |
| 5,873,031 | A | 2/1999 | Griffith et al. | 455/412 |
| 5,873,033 | A | 2/1999 | Hjern et al. | 455/417 |
| 5,878,343 | A | 3/1999 | Robert et al. | |
| 5,878,347 | A | 3/1999 | Joensuu et al. | 455/433 |
| 5,887,256 | A | 3/1999 | Lu et al. | 455/426 |
| 5,889,774 | A | 3/1999 | Mirashrafi et al. | |
| 5,890,064 | A | 3/1999 | Widergen et al. | 455/445 |
| 5,892,802 | A | 4/1999 | Jung et al. | 375/354 |
| 5,892,950 | A | 4/1999 | Rigori et al. | 717/146 |
| 5,898,931 | A | 4/1999 | I'Anson et al. | 455/560 |
| 5,901,352 | A | 5/1999 | St-Pierre et al. | 455/426 |
| 5,901,359 | A | 5/1999 | Malmstrom | 455/461 |
| 5,905,719 | A | 5/1999 | Arnold et al. | |
| 5,909,431 | A | 6/1999 | Kuthyar et al. | |
| 5,913,166 | A | 6/1999 | Buttitta et al. | 455/436 |
| 5,923,659 | A | 7/1999 | Curry et al. | |
| 5,924,030 | A | 7/1999 | Rautiola et al. | 455/426 |
| 5,943,619 | A | 8/1999 | Coyne et al. | 455/433 |
| 5,949,775 | A | 9/1999 | Rautiola et al. | 370/338 |
| 5,953,322 | A | 9/1999 | Kimball | 370/328 |
| 5,953,651 | A | 9/1999 | Lu et al. | 455/408 |
| 5,956,331 | A | 9/1999 | Rautiola et al. | 370/338 |
| 5,960,004 | A | 9/1999 | Ramström et al. | 370/469 |
| 5,960,176 | A | 9/1999 | Kuroki et al. | 709/223 |
| 5,960,344 | A | 9/1999 | Mahany | 455/432 |
| 5,970,059 | A | 10/1999 | Ahopelto et al. | |
| 5,978,672 | A | 11/1999 | Hartmaier et al. | 455/413 |
| 5,978,673 | A | 11/1999 | Alperovich et al. | 455/417 |
| 5,995,839 | A | 11/1999 | Coursey et al. | 455/445 |
| 5,995,843 | A | 11/1999 | Sjödin et al. | 455/462 |
| 5,999,810 | A | 12/1999 | Fuentes | 455/422 |
| 5,999,813 | A | 12/1999 | Lu et al. | 455/435 |
| 6,002,931 | A | 12/1999 | Yamaguchi et al. | 455/433 |
| 6,009,159 | A | 12/1999 | Baiyor et al. | |
| H1836 | H | 2/2000 | Fletcher et al. | 455/433 |
| H1837 | H | 2/2000 | Fletcher et al. | 455/433 |
| 6,026,086 | A | 2/2000 | Lancelot et al. | 370/353 |
| 6,031,833 | A | 2/2000 | Fickes et al. | |
| 6,034,950 | A * | 3/2000 | Sauer et al. | 370/310.2 |
| 6,058,422 | A | 5/2000 | Ayanoglu et al. | |
| 6,061,346 | A | 5/2000 | Nordman | |
| 6,073,015 | A | 6/2000 | Berggren et al. | |
| 6,097,817 | A | 8/2000 | Bilgic et al. | |
| 6,118,778 | A | 9/2000 | Amin | |
| 6,122,655 | A | 9/2000 | Goldovsky et al. | |
| 6,131,012 | A | 10/2000 | Struhsaker et al. | |
| 6,141,358 | A | 10/2000 | Hurst, Jr. et al. | |
| 6,145,001 | A * | 11/2000 | Scholl et al. | 709/223 |
| 6,151,492 | A | 11/2000 | Melin | |
| 6,154,465 | A | 11/2000 | Pickett | |
| 6,157,845 | A | 12/2000 | Henry et al. | |
| 6,163,531 | A | 12/2000 | Kumar | |
| 6,167,248 | A | 12/2000 | Hamalainen et al. | |
| 6,208,627 | B1 * | 3/2001 | Menon et al. | 370/328 |
| 6,219,557 | B1 | 4/2001 | Havinis | |
| 6,253,243 | B1 * | 6/2001 | Spencer | 709/224 |
| 6,269,244 | B1 | 7/2001 | Alperovich et al. | |
| 6,292,829 | B1 * | 9/2001 | Huang et al. | 709/223 |
| 6,295,558 | B1 | 9/2001 | Davis et al. | |
| 6,314,284 | B1 | 11/2001 | Patel et al. | |
| 6,330,660 | B1 | 12/2001 | Ganapathy et al. | |
| 6,359,880 | B1 | 3/2002 | Curry et al. | |
| 6,373,817 | B1 | 4/2002 | Kung et al. | |
| 6,377,799 | B1 | 4/2002 | Hameleers et al. | |
| 6,385,195 | B2 | 5/2002 | Sicher et al. | |
| 6,389,464 | B1 * | 5/2002 | Krishnamurthy et al. | 709/220 |
| 6,411,632 | B2 | 6/2002 | Lindgren et al. | |
| 6,424,638 | B1 | 7/2002 | Ray et al. | |
| 6,430,395 | B2 | 8/2002 | Arazi et al. | |
| 6,466,556 | B1 | 10/2002 | Boudreaux | |
| 6,466,583 | B1 * | 10/2002 | Laraqui | 370/465 |
| 6,473,411 | B1 * | 10/2002 | Kumaki et al. | 370/331 |
| 6,496,694 | B1 * | 12/2002 | Menon et al. | 455/426.2 |
| 6,539,237 | B1 * | 3/2003 | Sayers et al. | 455/555 |
| 6,571,095 | B1 | 5/2003 | Koodli | |
| 6,600,732 | B1 | 7/2003 | Sevanto et al. | |
| 6,603,761 | B1 | 8/2003 | Wang et al. | |
| 6,608,832 | B2 | 8/2003 | Forslöw | |
| 6,618,592 | B1 | 9/2003 | Vilander et al. | |
| 6,636,502 | B1 | 10/2003 | Lager et al. | |
| 6,662,005 | B1 | 12/2003 | Palvianen | |
| 6,671,511 | B1 | 12/2003 | Forssell et al. | |
| 6,697,352 | B1 | 2/2004 | Ludwig et al. | |
| 6,711,143 | B1 | 3/2004 | Balazinski et al. | |
| 6,795,444 | B1 | 9/2004 | Vo et al. | |
| 2001/0001268 | A1 * | 5/2001 | Menon et al. | 370/329 |
| 2001/0022784 | A1 * | 9/2001 | Menon et al. | 370/352 |
| 2002/0048268 | A1 | 4/2002 | Menon et al. | |

FOREIGN PATENT DOCUMENTS

| | | |
|---|---|---|
| EP | 0 944 223 A2 | 9/1999 |
| WO | 96/21983 A1 | 7/1996 |
| WO | 99/05830 A1 | 2/1999 |

| | | |
|---|---|---|
| WO | 99/48310 A1 | 9/1999 |
| WO | 99/63774 A1 | 12/1999 |
| WO | 00/38391 A1 | 6/2000 |
| WO | 00/48365 A1 | 8/2000 |

OTHER PUBLICATIONS

Design of a Proxy for Managing CMIP Agents Via SNMP, Eckhart Koerner, BNSDOCID:<XP_4086041A_I_>, Computer Communications 20 (1997) pp. 349-360.

Tool-Based Implementation of a Q-Adapter Function for the Seamless Integration of SNMP-Managed Devices in TMN, Alexander Keller, Munich Network Management Team, Faculty of Computer Science, Munich University of Technology, XP-000799511, pp. 400-411.

Digital cellular telecommunications system (Phase 2+); In-band control remote transcoders and rate adaptors for Enhanced Full Rate (EFR) and full rate traffic channels (GSM 08.60 version 7.0.1 Release 1998); "ESTI EN 300 737, V7.0.1 (2000-01); European Telecommunications Standards Institute", Jan. 2000, pp. 1-32.

Digital cellular telecommunications system (Phase 2+); General Packet Radio Service (GPRS); Service Description; Stage 2 (GSM 03.60 version 7.4.0 Release 1998) ETSI EN 301 344, v7.4.0; European Standard (Telecommunications series) pp. 1-117.

Gary A. Thom, "H.323: The Multimedia Communications Standard for Local Area Networks", IEEE Communications Magazine, pp. 52-59, Dec. 1996.

Smith, David R., Nour, Nina N., Syed R. Ali, "Integration of Wireless Technology in the Defense Information System Network (DISN)": Annual Militay Communications Conference, New York, USA, IEEE, vol. 15th, Oct. 22, 1996, pp. 389-393.

* cited by examiner

METHOD AND SYSTEM FOR PROVIDING MANAGEMENT PROTOCOL MEDIATION IN WIRELESS COMMUNICATIONS NETWORKS

CROSS-REFERENCE TO RELATED APPLICATIONS

This application is related to the following applications:

U.S. application Ser. No. 09/128,553, filed on Aug. 3, 1998, and entitled "A 'Plug and Play' Wireless Architecture Supporting Packet Data and IP Voice/Multimedia Services," pending; and U.S. application Ser. No. 09/219,539, filed on Dec. 23, 1998, and entitled "Wireless Local Loop System Supporting Voice/IP," pending.

All of the following applications are related:

U.S. application Ser. No. 09/499,921, filed concurrently herewith, and entitled "Method and System for Interworking Voice Bearer Messages Between Circuit-Switched and Packet-Switched Networks," pending;

U.S. application Ser. No. 09/499,923, filed concurrently herewith, and entitled "Method and System for Interworking Voice Signaling Messages Between Circuit-Switched and Packet-Switched Networks," pending;

U.S. application Ser. No. 09/500,751, filed concurrently herewith and entitled "Method and System for Incorporating Legacy Private Branch Exchange Features in a Wireless Network," pending;

U.S. application Ser. No. 09/500,379, filed concurrently herewith, and entitled "Method and System for Providing User Mobility Between Public and Private Wireless Networks," pending; and U.S. application Ser. No. 09/499,922, filed concurrently herewith, and entitled "Method and System for Providing Management Protocol Mediation in Wireless Communications Networks," pending.

These applications have been commonly assigned to Opuswave Networks, Inc.

TECHNICAL FIELD OF THE INVENTION

This invention relates generally to the field of telecommunications and, more specifically, to a method and system for providing management protocol mediation between wireless communications networks.

BACKGROUND OF THE INVENTION

Private branch exchanges, or PBXs, are well-known in the art of telecommunications. Corporations, organizations, and other enterprises typically use PBXs to provide internal telephone services to their personnel. The personnel may call one another without using an external switched public telephone network, although the PBX is coupled to the public telephone networks for making external local and long distance calls. Telephones are usually coupled to the PBX by wireline connections. PBXs also typically implement a variety of features, including call waiting, call forwarding, conferencing, and call blocking.

Packet-switched computer networks are also common. Corporations and other enterprises typically use the computer networks to provide computer and data services to their personnel. The networks often take the form of a Local Area Network (LAN), a Wide Area Network (WAN), or a Metropolitan Area Network (MAN). These networks typically are used to transfer and share data files and to send and receive e-mail. In addition, developments in the area of Voice over IP (VoIP) allow the packet-switched networks to transmit voice messages.

Recently, interest in wireless networks has increased. Wireless networks allow mobile stations, or wireless units, to communicate over a wireless interface. The mobile station may be a wireless telephone communicating with a voice network over the wireless interface. The mobile station may also be a computer communicating with a data network over the wireless interface. Wireless communications may be over private or public networks. Operators of the wireless networks often wish to integrate the wireless networks into the existing PBXs and computer networks.

The PBX, wireless network, and computer network are usually separate networks since each of them often uses different protocols to transfer messages and manage elements of the network. The inability to fully integrate the wireless network with the PBX and computer network inhibits the wireless network from performing several key functions. Without full integration, mobile station users may have difficulty accessing the PBX and the computer network. Also, the mobile station users may not be able to roam between the private wireless network and the public wireless network. The mobile station user cannot move in and out of the private wireless network while talking. Instead, the user has to terminate the call, move to the other network, and reestablish a connection. In addition, the inability to fully integrate the networks may force the mobile station users to have two different wireless phones, one for the private wireless network and one for the public wireless network. Further, to provide PBX features in a wireless network, the wireless network operator typically installs substantial hardware and/or software in the wireless network to provide these features. However, even though the PBX-like features are implemented in the wireless network, the PBX and the wireless network still remain separate.

SUMMARY OF THE INVENTION

In accordance with the present invention, a method and system for providing management protocol mediation in wireless communications networks is provided that substantially eliminates or reduces disadvantages and problems associated with previously developed systems and methods.

A system for providing management protocol mediation between wireless networks is disclosed. The system comprises a first wireless network operable to communicate with a mobile station over a wireless interface. The system also comprises a second wireless network having an operations and maintenance center (OMC) coupled thereto and operable to execute an application to manage the first wireless network using a first management protocol. The OMC is further operable to manage the second wireless network using a second management protocol. The system further comprises a protocol mediator coupled to the first and second wireless networks. The protocol mediator is operable to translate between the first management protocol and the second management protocol.

A method of providing management protocol mediation between wireless networks is also disclosed. The method comprises the step of executing at a first wireless network an application in an operations and maintenance center using a first management protocol. The method also comprises the step of managing a second wireless network using a second management protocol. The method further comprises the step of translating between the first and second management protocols.

A technical advantage of the present invention is that different management protocols can be used to manage the different networks. One management protocol can be used to manage the public wireless network, and a second management protocol can be used to manage the private network. The use of different protocols supports a higher degree of customization, allowing more appropriate protocols to be used where needed. It also allows a private wireless network using a different protocol to be integrated with the public network. Once integrated, the wireless network can make use of the features currently installed in the existing PBX. Mobile stations can also use the existing PBX to gain access to external voice networks like the public phone systems, and the mobile stations can use the computer network to gain access to external data networks like the Internet. In addition, mobile station users only need one wireless phone, rather than one for the public wireless network and one for the private wireless network. The mobile station users may also roam between the private wireless network and the public wireless network without terminating a call and reestablishing a connection.

BRIEF DESCRIPTION OF THE DRAWINGS

For a more complete understanding of the present invention, and for further features and advantages, reference is now made to the following description, taken in conjunction with the accompanying drawings, in which.

DETAILED DESCRIPTION OF THE DRAWINGS

Embodiments of the present invention and its advantages are best understood by referring to FIGS. 1 through 8 of the drawings, like numerals being used for like and corresponding parts of the various drawings.

Figure 1:
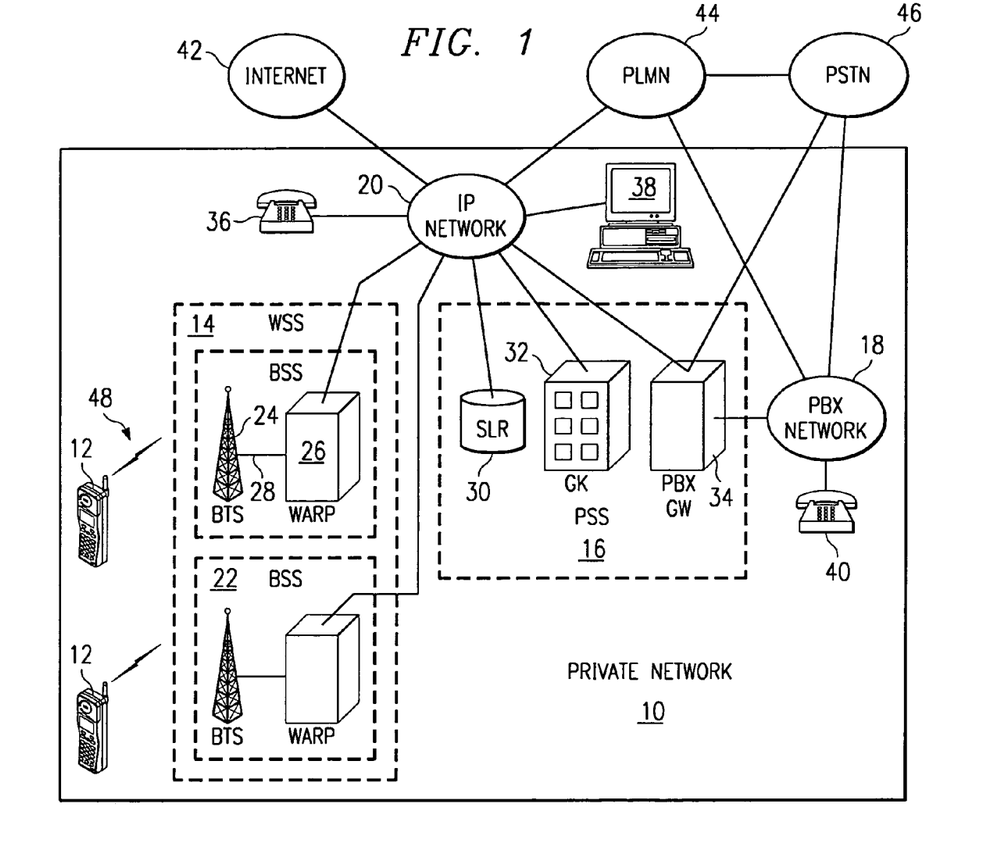
FIG. 1 illustrates a private communications network, including one or more wireless subsystems, coupled to existing public and private voice and data networks in accordance with the teachings of the present invention.

FIG. 1 illustrates a private communications network coupled to existing public and private voice and data networks in accordance with the teachings of the present invention. Private network 10 comprises one or more mobile stations (MS) 12, a wireless subsystem (WSS) 14, a packet switching subsystem (PSS) 16, a private branch exchange (PBX) 18, and an Internet Protocol (IP) network 20.

Mobile station 12 comprises any device capable of communicating with a base station 24 over a wireless interface 48. Mobile station 12 may comprise, for example, a Global System for Mobile communication (GSM) mobile station capable of delivering a circuit-switched speech service. Alternatively, mobile station 12 may comprise a portable computer with a microphone or a phone coupled to a wireless modem. Mobile station 12 may also comprise a computer and a phone coupled to a radio unit. In this document, the terms "couple," "coupled," and "coupling" refer to any direct or indirect connection between two elements within private network 10, whether or not the two elements are in physical contact with one another.

Wireless subsystem 14 comprises one or more base station subsystems (BSS) 22. Each base station subsystem 22 comprises a base transceiver station (BTS) 24, also called a base station 24, and a wireless adjunct internet platform (WARP) 26.

Base station 24 is coupled to WARP 26 by an interface 28. Base station 24 also provides bi-directional communication with mobile station 12 in a specified geographic area over wireless interface 48. Base station 24 is operable to transfer messages between mobile station 12 and WARP 26. Base station 24 may comprise, for example, one or more transceivers capable of transmitting and receiving circuit-switched messages from mobile station 12 over wireless interface 48. In one embodiment, base station 24 and mobile station 12 communicate using the GSM 04.08 signaling message and 08.60 bearer message protocols.

Wireless interface 48 couples mobile station 12 and base station 24. In this document, the term "wireless" designates the use of a radio or over-the-air interface to communicate with mobile station 12. Wireless interface 48 may comprise any of a number of available wireless interfaces capable of transferring circuit-switched messages between mobile station 12 and base station 24. In one embodiment, mobile station 12 and base station 24 communicate using the GSM General Packet Radio Service (GSM/GPRS) interface. In another embodiment, base station 24 and mobile station 12 communicate using the GSM Enhanced Data rates for GSM Evolution (GSM/EDGE) interface.

WARP 26 is coupled to base station 24 by interface 28 and to IP network 20. WARP 26 allows users of mobile stations 12 to gain access to internal networks and to external voice and data networks. In one embodiment, WARP 26 communicates with mobile station 12 through base station 24 using a circuit-switched message protocol, and WARP 26 communicates with IP network 20 using a packet-switched message protocol. WARP 26 also provides interworking for the transmission of messages through private network 10. WARP 26 translates between the circuit-switched and the packet-switched protocols. In one embodiment, WARP 26 converts circuit-switched messages from mobile station 12 into packetized messages suitable for transmission over IP network 20. WARP 26 also converts packetized messages from IP network 20 into circuit-switched messages sent to mobile station 12. In a particular embodiment, WARP 26 uses the architecture specified in the International Telecommunications Union-Telecommunications (ITU-T) H.323 protocol standard for provisioning IP packet voice services.

Interface 28 couples base station 24 and WARP 26. Interface 28 may be any of a number of available interfaces capable of transferring circuit-switched messages between base station 24 and WARP 26. Interface 28 may comprise, for example, a GSM Abis wireline interface.

IP network 20 transmits and receives packet-switched messages from one address in IP network 20 to another address. IP network 20 may comprise any number of available packet-switched networks. IP network 20 may, for example, comprise a Local Area Network or a Wide Area Network. An IP phone 36 and a workstation 38 may also be coupled to IP network 20. IP network 20 may also be coupled to an external data network such as Internet 42 or to an external voice network like a public land mobile network (PLMN) 44.

Packet switching subsystem 16 comprises a subscriber location register (SLR) 30, a gatekeeper (GK) 32, and a PBX gateway (GW) 34. Subscriber location register 30 is coupled to IP network 20. Subscriber location register 30 stores subscriber management information for each mobile station 12. Subscriber location register 30 stores general subscriber management information downloaded from PLMN 44. Subscriber location register 30 also stores each user's extension number, direct dial number, and any other information that is specific to private network 10. Subscriber location register 30 may comprise, for example, a SUN™ workstation with a database.

PBX gateway 34 is coupled to IP network 20, a PBX 18, and a public switched telephone network (PSTN) 46. PBX gateway 34 communicates with IP network 20 using a packet-switched message protocol. PBX gateway 34 also communicates with PBX 18 or PSTN 46 using a circuit-switched message protocol. PBX gateway 34 provides the interworking functionality between packet-switched messages transmitted to and received from IP network 20 and circuit-switched messages transmitted to and received from PBX 18 or PSTN 46. In one embodiment, PBX gateway 34 communicates over IP network 20 using the ITU-T H.323 protocol standard, PBX gateway 34 communicates with PBX 18 using a PBX interface protocol, and PBX gateway 34 provides the interworking between the protocols.

Gatekeeper 32 is coupled to IP network 20. Gatekeeper 32 provides call control services for mobile stations 12, WARPs 26, and PBX gateway 34. Gatekeeper 32 tracks the location of each mobile station 12, and gatekeeper 32 routes calls to and from the WARP 26 currently serving a particular mobile station 12. This allows users of mobile stations 12 to roam freely between geographic areas covered by different base stations 24.

PBX 18 is coupled to PBX gateway 34, PLMN 44, and PSTN 46. PBX 18 may transmit and receive circuit-switched messages from PBX gateway 34, PLMN 44, and PSTN 46. PBX 18 may also communicate with a telephone 40 coupled to PBX 18. PBX 18 may be any of a number of available PBX networks capable of transmitting and receiving circuit-switched messages. PBX 18 may, for example, be a legacy PBX already installed within an existing private network.

In an alternate embodiment of private network 10, private network 10 replaces a legacy PBX 18. In this embodiment, gatekeeper 32 and PBX gateway 34 perform the functions normally implemented in PBX 18.

Figure 2:
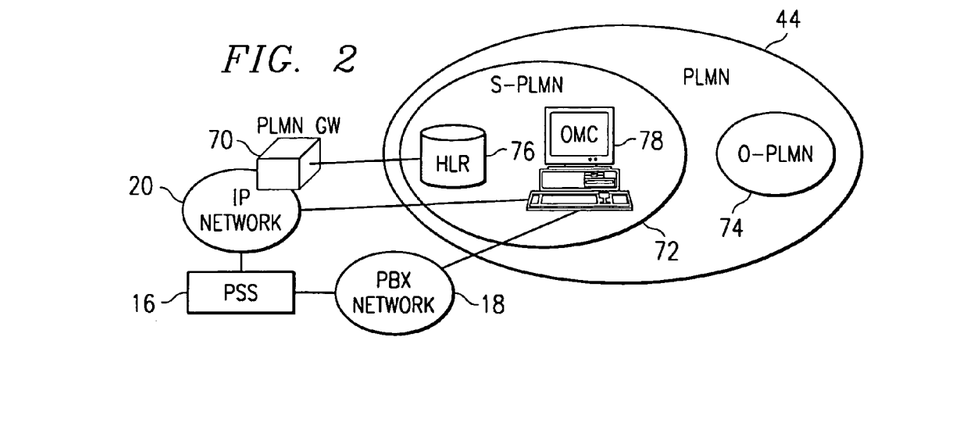
FIG. 2 illustrates, in greater detail, the integration of the private communications network and a public mobile land network (PLMN)

FIG. 2 illustrates the integration of private network 10 and PLMN 44. PLMN 44 comprises a serving public land mobile network (S-PLMN) 72 and one or more other public land mobile networks (O-PLMN) 74.

S-PLMN 72 is a public land mobile network that provides wireless communications services in a geographic area where private network 10 is located. Private network 10 is coupled to S-PLMN 72 through IP network 20 and PBX 18. Private network 10 transmits and receives voice and mobility management messages from S-PLMN 72. In one embodiment, S-PLMN 72 comprises a GSM public land mobile network.

O-PLMN 74 is a public land mobile network that provides wireless communications services, but not to private network 10. Because O-PLMNs 74 do not provide wireless services to private network 10, private network 10 does not transmit a signal directly to O-PLMNs 74. Instead, private network 10 may communicate with O-PLMN 74 indirectly through S-PLMN 72 or PSTN 46.

S-PLMN 72 comprises a home location register (HLR) 76 and an operations and maintenance center (OMC) 78. Home location register 76 is coupled to IP network 20 through a PLMN gateway (PLMN GW) 70. Home location register 76 handles location management functions for S-PLMN 72. Home location register 76 is operable to transfer general subscriber management information to subscriber location register 30 when each mobile station 12 registers with a WARP 26 within private network 10. Home location register 76 also tracks the location of each mobile station 12. When mobile station 12 moves into private network 10, home location register 76 tracks which WARP 26 is currently serving mobile station 12. If mobile station 12 roams between two WARPs 26, home location register 76 updates the location of mobile station 12. When mobile station 12 leaves private network 10, home location register 76 tracks the location of mobile station 12 within S-PLMN 72. Home location register 76 may comprise, for example, a SUN™ workstation with a database.

OMC 78 is coupled to IP network 20 and PBX network 18. OMC 78 manages the operation of base station subsystems 22 in wireless subsystem 14 within private network 10. OMC 78 is operable to execute management applications for an operator of S-PLMN 72. OMC 78 may comprise, for example, one or more SUN™ workstations.

PLMN gateway 70 is coupled to IP network 20 and to home location register 76. PLMN gateway 70 provides a transmission interface between private network 10 and S-PLMN 72. Through PLMN gateway 70, private network 10 may exchange circuit-switched voice messages with S-PLMN 72. Private network 10 may also exchange circuit-switched mobility management messages with S-PLMN 72. PLMN gateway 70 may be any of a number of available gateways.

Figure 3:
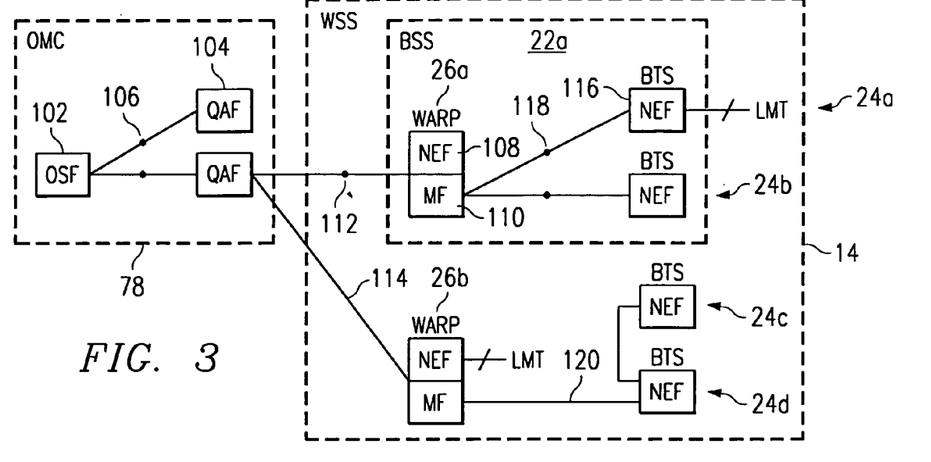
FIG. 3 illustrates, in greater detail, a functional architecture for managing the wireless subsystems.

FIG. 3 illustrates one embodiment of a functional architecture for managing wireless subsystems 14. The architecture is implemented within OMC 78 and wireless subsystem 14. OMC 78 and wireless subsystem 14 may use a Telecommunications Network Management (TNM) architecture. In this embodiment, interactions across TNM interfaces use a manager-agent relationship and an abstraction of network resources in a management information model. Elements within private network 10 may also use other management protocols, and each management protocol has a corresponding management information model.

In OMC 78, the architecture comprises an operations system function (OSF) 102, a Q-Adaptor function (QAF) 104, and an interface 106. Operation system function 102 represents management functions performed by OMC 78. In one embodiment, OMC executes management applications to manage wireless subsystem 14 for an operator of PLMN 44 using a Common Management Information Protocol (CMIP) management protocol.

Q-Adaptor function 104 is coupled to operations system function 102 and wireless subsystem 14. Q-Adaptor function 104 performs a translation function between management protocols used by OMC 78 and wireless subsystem 14. In one embodiment, OMC executes management applications using the CMIP management protocol, and OMC 78 manages wireless subsystem 14 using a Simple Network Management Protocol (SNMP) management protocol. Q-Adaptor function 104 translates between the CMIP management protocol used within OMC 78 and the SNMP management protocol used between OMC 78 and wireless subsystem 14.

Interface 106 couples operations system function 102 and Q-Adaptor function 104. Interface 106 is operable to transfer CMIP management messages between operations system function 102 and Q-Adaptor function 104. In one embodiment, interface 108 comprises a TNM interface.

The functional architecture in wireless subsystem 14 comprises a network element function (NEF) 108 and a mediation function (MF) 110 in WARP 26 and a network element function 116 in base station 24. Network element function 108 represents management functions performed by WARP 26. Network element function 116 represents management functions performed by base station 24. In one embodiment, base station 24 performs management operations using a GSM Abis object oriented management protocol based on a GSM 12.21 protocol, and WARP 26 performs management operations using the SNMP management protocol.

Mediation function 110 provides a translation function between the management protocols used by WARP 26 and base station 24. In one embodiment, mediation function translates between the SNMP management information model used in WARP 26 and the GSM Abis object oriented management information model used in base station 24.

An interface 112 couples OMC 78 and WARP 26a. Interface 112 is operable to transfer SNMP management messages between OMC 78 and WARP 26a. In one embodiment, interface 112 comprises a TNM interface. An interface 118 couples WARP 26a to base station 24a. Another interface 118 couples WARP 26a to base station 24b. Each base station 24a–24b is coupled to WARP 26a. Interface 118 may comprise, for example, a TNM interface.

An interface 114 couples OMC 78 and WARP 26b. Interface 114 is operable to transfer SNMP management messages between OMC 78 and WARP 26b. An interface 120 couples WARP 26b to base station 24d, and base station 24c is coupled to base station 24d. Only one base station 24d is coupled to WARP 26b. In this embodiment, interface 114 and interface 120 are not TNM interfaces since the lack of a direct link between WARP 26b and base station 24c is inconsistent with the TNM architecture. Interface 114 may comprise an interface operable to transfer SNMP messages between OMC 78 and WARP 26b. Interface 120 may comprise an interface operable to transfer GSM Abis object oriented management messages between WARP 26b and base station 24d.

Figure 4:
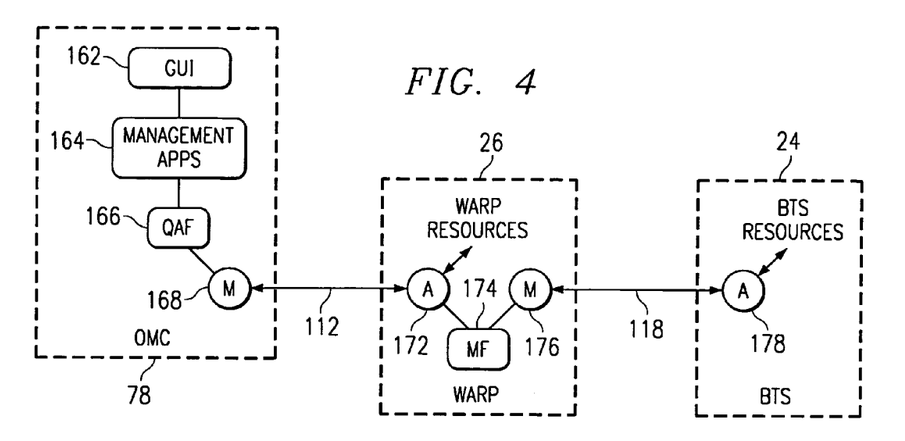
FIG. 4 illustrates, in greater detail, an architecture for managing the wireless subsystems using the functional architecture of FIG. 3.

FIG. 4 illustrates one embodiment of the architecture of OMC 78, WARP 26, and base station 24 for managing wireless subsystem 14 using the functional architecture of FIG. 3. OMC 78 comprises a graphical user interface (GUI) 162, one or more management applications 164, a Q-Adaptor function module 166, and a manager 168. Graphical user interface 162 comprises an interface allowing an operator of S-PLMN 72 to gain access to and use OMC 78. Graphical user interface 162 may comprise any of a number of available graphical user interfaces.

Management application 164 is coupled to graphical user interface 162 and to Q-Adaptor function module 166. Management application 164 comprises one or more applications accessed and used by an operator of S-PLMN 72. Each management application 164 may comprise any number of management operations supported by the management protocol implemented in OMC 78. In one embodiment, management applications 164 perform CMIP operations. In another embodiment, management applications 164 comprise International Telephone and Telegraph Consultative Committee X.700 management applications.

Q-Adaptor function module 166 is coupled to management application 164 and manager 168. Q-Adaptor function module 166 acts as a protocol mediator, performing the Q-Adaptor function 104 of FIG. 3. In one embodiment, Q-Adaptor function module 166 communicates with management application 164 using the CMIP management protocol and with WARP 26 through manager 168 using the SNMP management protocol. Q-Adaptor function module 166 performs the translation between the two management protocols.

Manager 168 is coupled to Q-Adaptor function module 166 and to WARP 26 through interface 112. In one embodiment, manager 168 is operable to communicate with WARP 26 over TNM interface 112.

WARP 26 comprises an agent 172, a mediation function module 174, and a manager 176. Agent 172 is coupled to OMC 78 through interface 112 and to mediation function module 174. Agent 172 acts as a counterpart to manager 168. Together, manager 168 and agent 172 control interactions across interface 112.

Mediation function module 174 is coupled to agent 172 and manager 176. Mediation function module 174 performs the mediation function 110 of FIG. 3. In one embodiment, mediation function module 174 communicates with OMC 78 through agent 172 using the SNMP management protocol and with base station 24 through manager 176 using the GSM Abis object oriented management protocol. Mediation function module 174 performs the translation between the two management protocols.

Manager 176 is coupled to mediation function module 174 and to base station 24 through interface 118. In one embodiment, manager 176 is operable to communicate with base station 24 over TNM interface 118.

Base station 24 comprises an agent 178. Agent 178 is coupled to WARP 26 through interface 118. Agent 178 acts as a counterpart to manager 176, and together manager 176 and agent 178 control interactions across interface 118.

Figure 5:
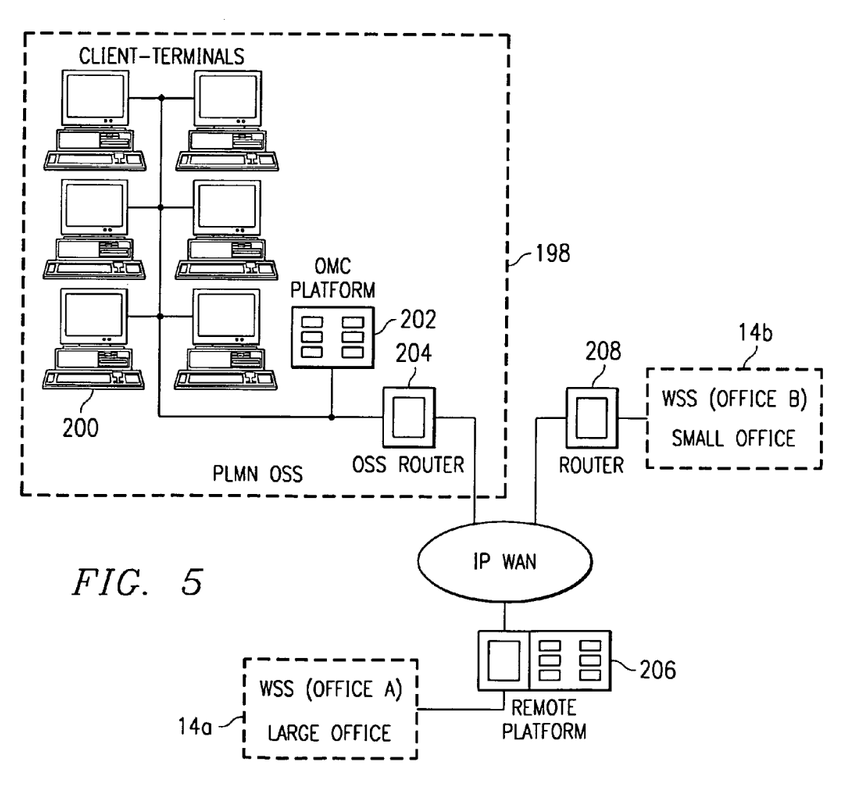
FIG. 5 illustrates, in greater detail, the integration of a protocol mediator with the private communications network and the PLMN.

FIG. 5 illustrates several alternate embodiments for integrating Q-Adaptor function module 166 with private network 10 and PLMN 44. PLMN 44 comprises a PLMN operations support system (OSS) 198, which comprises one or more client terminals 200, an OMC platform 202, and an OSS router 204.

Client terminals 200 are coupled to OMC platform 202 and to OSS router 204. Client terminal 200 may be a workstation comprising graphical user interface 162 and management application 164. Client terminal 200 may comprise, for example, a SUN™ workstation.

OMC platform 202 is coupled to client terminal 200 and to OSS router 204. OMC platform 202 comprises Q-Adaptor function module 166 and a PLMN operations system. The PLMN operations system provides an operating system for the PLMN OSS to use in managing wireless subsystems 14. Q-Adaptor function module 166 performs the translation function between management protocols used in OMC 78 and WARP 26.

OSS router 204 is coupled to client terminal 200, OMC platform 202, and IP network 20. OSS router 204 transmits messages to an address in IP network 20, and OSS router 204 receives messages from IP network 20 for client terminal 200 or OMC platform 202. OSS router 204 may be any of a number of available routers.

In one embodiment, Q-Adaptor function module 166 and the PLMN operations system are implemented within a single platform 202. In another embodiment, Q-Adaptor function module 166 and the PLMN operations system may be implemented on different platforms within PLMN OSS 198. With either embodiment, OSS router 204 communicates with wireless subsystems 14a and 14b using the SNMP management protocol over a User Datagram Protocol/Internet Protocol (UDP/IP) connection. OSS router 204 is also operable to support a File Transfer Protocol (FTP) over a Transmission Control Protocol/Internet Protocol (TCP/IP) connection.

In another alternate embodiment, Q-Adaptor function module 166 could be implemented on a remote platform 206. Remote platform 206 is coupled to IP network 20 and wireless subsystem 14a. In this embodiment, remote platform 206 comprises Q-Adaptor function module 166 and a private network router. Q-Adaptor function module 166 does not reside within OMC 78. Instead, OSS router 204 communicates with remote platform 206 over IP network 20, and remote platform 206 performs the Q-Adaptor function 104. OSS router 204 communicates with remote platform 206 using the CMIP management protocol. Remote platform 206 also supports the File Transfer Protocol over TCP/IP connections. For a large wireless subsystem 14a, remote deployment of Q-Adaptor function module 166 allows CMIP agent features to be used more effectively. In the illustrated embodiment, remote platform 206 includes both Q-Adaptor function module 166 and the private network router on a single platform 206. In another embodiment, Q-Adaptor function module 166 and the private network router could be implemented on separate platforms within private network 10.

Router 208 couples wireless subsystem 14b to IP network 20. Wireless subsystem 14b can be a smaller wireless subsystem than wireless subsystem 14a. In this embodiment, router 208 communicates with OMC platform 202 or remote platform 206 over IP network 20 using the SNMP management protocol over UDP/IP connections. Router 208 also supports the File Transfer Protocol over TCP/IP connections.

Figure 6:
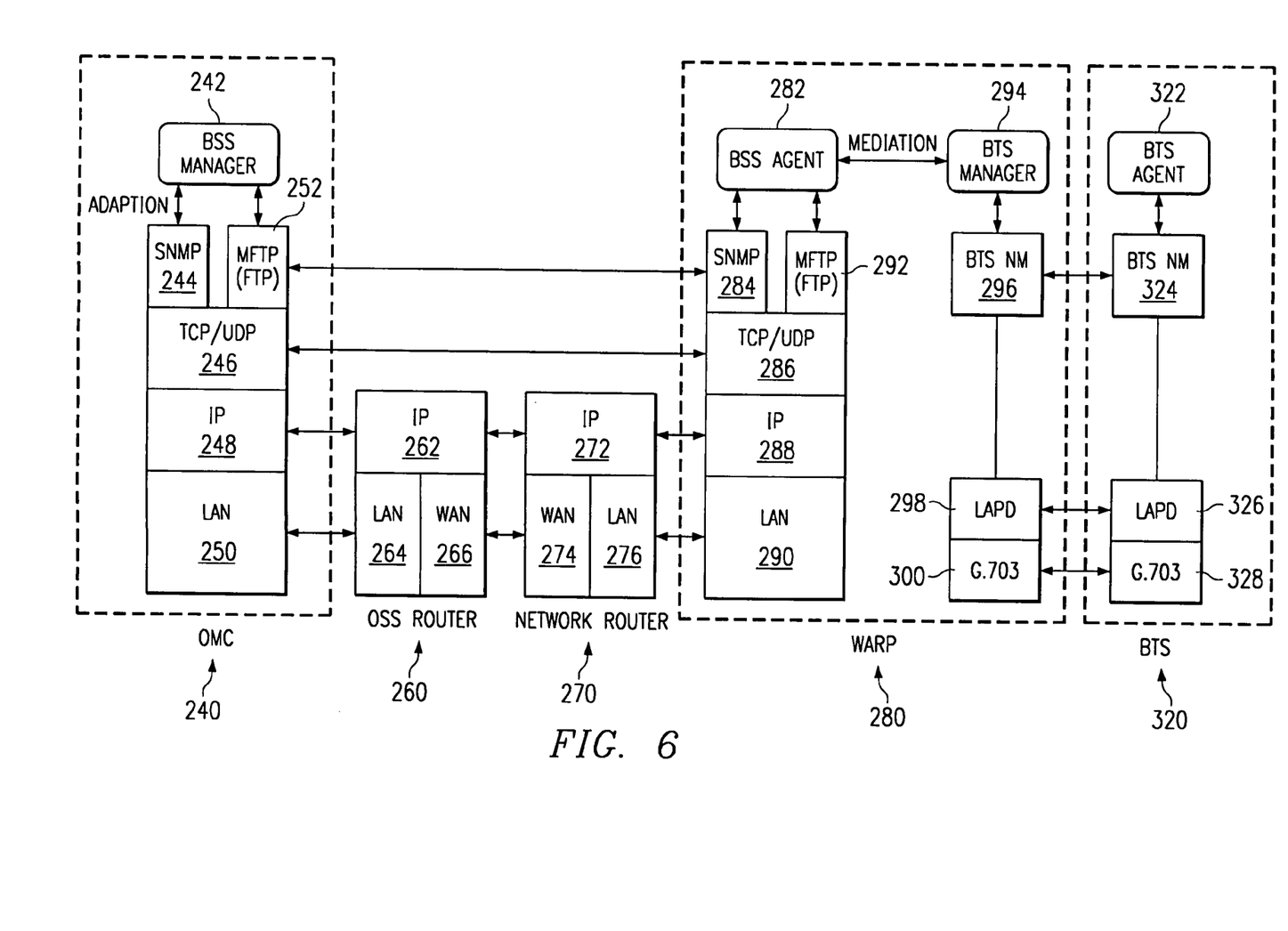
FIG. 6 illustrates, in greater detail, a protocol architecture for managing the wireless subsystems.

FIG. 6 illustrates one embodiment of a protocol architecture used for managing wireless subsystem 14. The protocol architecture comprises an OMC protocol stack 240, a PLMN OSS router protocol stack 260, a private network router protocol stack 270, a WARP protocol stack 280, and a base transceiver station protocol stack 320.

OMC protocol stack 240 comprises a base station subsystem manager layer 242, a SNMP layer 244, a TCP/UDP layer 246, an Internet Protocol (IP) layer 248, a Local Area Network (LAN) layer 250, and a Multicast File Transfer Protocol (MFTP) layer 252. PLMN OSS router protocol stack 260 comprises an Internet Protocol layer 262, a LAN layer 264, and a Wide Area Network (WAN) layer 266. Private network router protocol stack 270 comprises an Internet Protocol layer 272, a WAN layer 274, and a LAN layer 276.

WARP protocol stack 280 comprises a base station subsystem agent layer 282, a SNMP layer 284, a TCP/UDP layer 286, an Internet Protocol layer 288, a LAN layer 290, a MFTP layer 292, a base transceiver station manager layer 294, a base transceiver station network management (NM) layer 296, a Link Access Procedures for the D-Channel (LAPD) protocol layer 298, and a G.703 protocol layer 300. Base transceiver station protocol stack 320 comprises a base transceiver station agent layer 322, a base transceiver station network management layer 324, a LAPD protocol layer 326, and a G.703 protocol layer 328.

Base station subsystem manager layer 242 and base station subsystem agent layer 282 support the use of the Telecommunications Network Management protocol over interface 112 by controlling the interactions across interface 112. SNMP layers 244 and 284 support the transfer of SNMP management protocol messages between OMC 78 and WARP 26. MFTP layers 252 and 292 support the transmission of management messages between OMC 78 and WARP 26 using the Multicast File Transfer Protocol and the File Transfer Protocol. TCP/UDP layers 246 and 286, along with Internet Protocol layers 248, 262, 272, and 288, support the use of TCP/IP and UDP/IP connections between OMC 78 and WARP 26.

LAN layers 250 and 264 support the transfer of management messages between PLMN OSS 198 and OSS router 204. WAN layers 266 and 274 support the transmission of management messages between OSS router 204 and the private network router on remote platform 206 over IP network 20, which in this embodiment is a WAN. LAN layers 276 and 290 support the transfer of management messages between the private network router on remote platform 206 and wireless subsystem 14a over IP network 20.

Base transceiver station manager layer 294 and base transceiver station agent layer 322 support the use of the Telecommunications Network Management protocol over interface 118, controlling the interactions across interface 118. Base transceiver station network management layers 296 and 324 support the use of the GSM Abis object oriented management protocol between WARP 26 and base station 24. LAPD protocol layers 298 and 326 support the establishment, maintenance, and release of GSM-managed circuits over wireless interface 48 between base station 24 and mobile station 12. G.703 protocol layers 300 and 328 support the use of a G.703 transmission protocol between WARP 26 and base station 24.

In this embodiment, Q-Adaptor function module 166 performs a protocol mediation between base station subsystem manager layer 242 and SNMP layer 244, and between base station subsystem manager layer 242 and MFTP layer 252 in OMC 78. Mediation function module 174 performs another protocol mediation between base station subsystem agent layer 282 and base transceiver station manager layer 294 in WARP 26.

Figure 7:
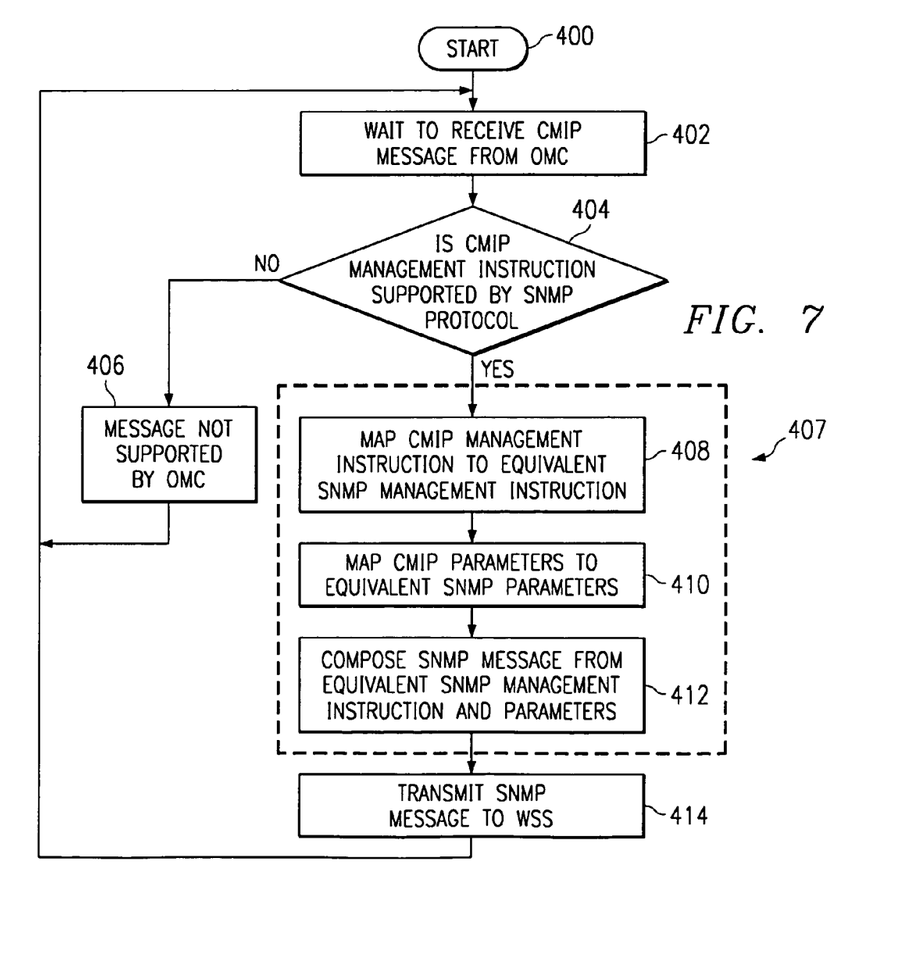
FIG. 7 is a flowchart illustrating a translation function performed by the protocol mediator.

FIG. 7 is a flowchart illustrating one embodiment of a translation function performed by Q-Adaptor function module 166. Q-Adaptor function module 166 is initialized at a step 400. Q-Adaptor function module 166 waits to receive CMIP management messages from OMC 78 at a step 402. The CMIP management messages may contain a management instruction and at least one parameter.

When Q-Adaptor function module 166 receives a management message from OMC 78, Q-Adaptor function module 166 checks to see if the CMIP message contains a management instruction that is supported in the SNMP management protocol at a step 404. If not, Q-Adaptor function module 166 determines that the CMIP instruction is not supported in the SNMP management protocol at a step 406. Q-Adaptor function module 166 may take an appropriate action, such as returning an error message to OMC 78. Q-Adaptor function module 166 returns to step 402 to await another message from OMC 78.

If the management instruction is supported in the SNMP management protocol, Q-Adaptor function module 166 performs a translation function 407. Q-Adaptor function module 166 maps the management instruction from the CMIP management protocol to an equivalent SNMP management protocol instruction at a step 408. Q-Adaptor function module 166 maps the parameters sent in the CMIP management message to equivalent SNMP management protocol parameters at a step 410. Q-Adaptor function module 166 composes a SNMP management message using the equivalent SNMP management instruction and parameters at a step 412. Q-Adaptor function module 166 transmits the composed SNMP management message to wireless subsystem 14 at a step 414. Q-Adaptor function module returns to step 402 to await another CMIP message from OMC 78.

Figure 8:
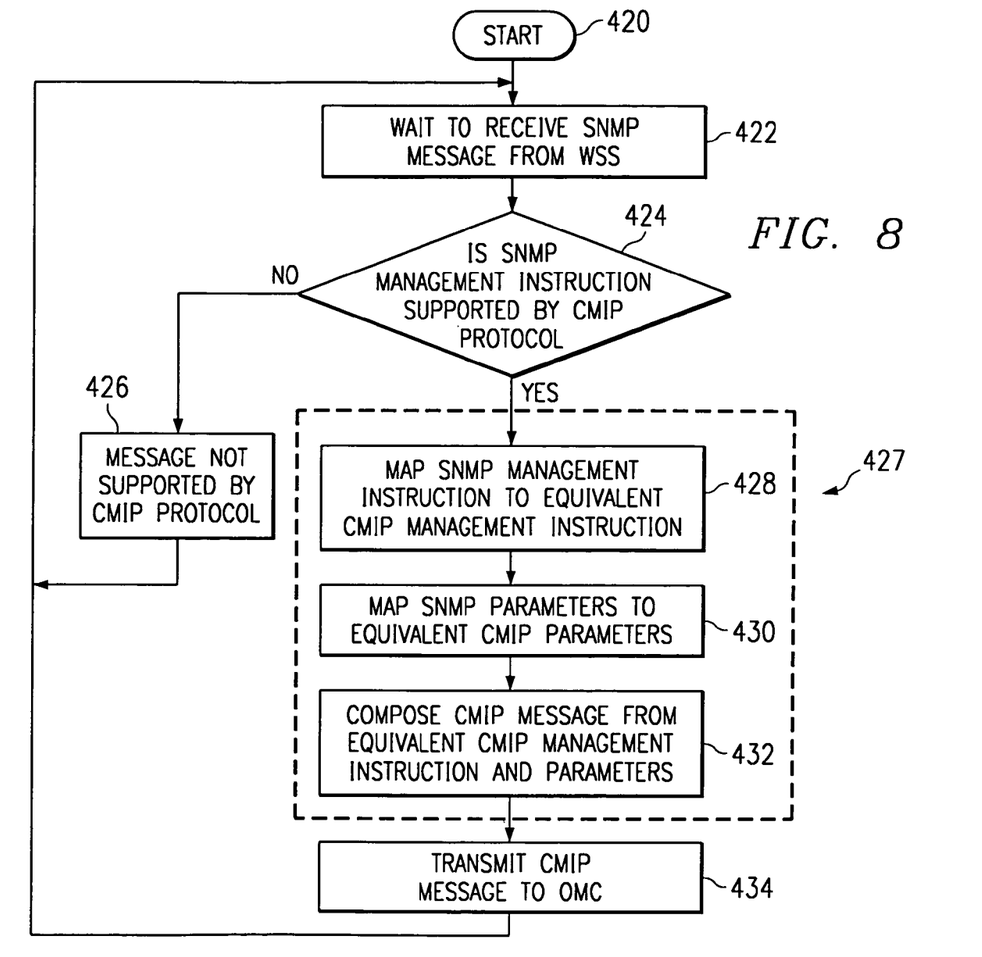
FIG. 8 is a flowchart illustrating another translation function performed by the protocol mediator.

FIG. 8 is a flowchart illustrating one embodiment of another translation function performed by Q-Adaptor function module 166. Q-Adaptor function module 166 is initialized at a step 420. Q-Adaptor function module 166 waits to receive SNMP management messages from wireless subsystem 14 at a step 422. The SNMP management messages may contain a management instruction and at least one parameter.

When Q-Adaptor function module 166 receives a management message from wireless subsystem 14, Q-Adaptor function module 166 checks to see if the SNMP message contains a management instruction that is supported in the CMIP management protocol at a step 424. If not, Q-Adaptor function module 166 determines that the SNMP instruction is not supported in the CMIP management protocol at a step 426. Q-Adaptor function module 166 may take an appropriate action, such as returning an error message to wireless subsystem 14. Q-Adaptor function module 166 returns to step 422 to await another message from OMC 78.

If the management instruction is supported in the CMIP management protocol, Q-Adaptor function module 166 performs a translation function 427. Q-Adaptor function module 166 maps the management instruction from the SNMP management protocol to an equivalent CMIP management protocol instruction at a step 428. Q-Adaptor function module 166 maps the parameters sent in the SNMP management message to equivalent CMIP management protocol parameters at a step 430. Q-Adaptor function module 166 composes a CMIP management message using the equivalent CMIP management instruction and parameters at a step 432. Q-Adaptor function module 166 transmits the composed CMIP management message to OMC 78 at a step 434. Q-Adaptor function module returns to step 422 to await another SNMP message from wireless subsystem 14.

The method shown in FIGS. 7 and 8 shows the translation between CMIP management messages and SNMP management messages. A similar method may also performed by mediation function module 174 in translating between SNMP management messages and GSM Abis object oriented management messages.

Although an embodiment of the invention and its advantages are described in detail, a person skilled in the art could make various alternations, additions, and omissions without departing from the spirit and scope of the present invention as defined by the appended claims.

What is claimed is:

1. A system for providing management protocol mediation between wireless networks comprising:
    a first wireless network operable to communicate with a mobile station over a wireless interface;
    a second wireless network having an operations and maintenance center (OMC) coupled thereto and operable to execute an application to manage the second wireless network using a second management protocol, the OMC further operable to manage the first wireless network using a first management protocol; and
    a protocol mediator coupled to the first and second wireless networks, the protocol mediator operable to translate between the first management protocol and the second management protocol.

2. The system of claim 1, wherein the second management protocol comprises a Common Management Information Protocol management protocol.

3. The system of claim 1, wherein the first management protocol comprises a Simple Network Management Protocol management protocol.

4. The system of claim 1, wherein the protocol mediator is coupled to the OMC by a first Telecommunications Network Management interface, and the protocol mediator is coupled to the first wireless network by a second Telecommunications Network Management interface.

5. The system of claim 1, wherein the first wireless network comprises:
    a base station operable to communicate with the mobile station over the wireless interface; and
    a wireless adjunct internet platform (WARP) coupled to the base station and operable to communicate with the mobile station through the base station.

6. A system for providing management protocol mediation between wireless networks comprising:
    a first wireless network operable to communicate with a mobile station over a wireless interface, wherein the first wireless network comprises:
        a base station operable to communicate with the mobile station over the wireless interface; and
        a wireless adjunct internet platform (WARP) coupled to the base station and operable to communicate with the mobile station through the base station, wherein the WARP is operable to manage the base station using a third management protocol, the WARP comprising a mediation function operable to translate between the first management protocol and the third management protocol;
    a second wireless network having an operations and maintenance center (OMC) coupled thereto and operable to execute an application to manage the second wireless network using a second management protocol, the OMC further operable to manage the first wireless network using a first management protocol; and
    a protocol mediator coupled to the first and second wireless networks, the protocol mediator operable to translate between the first management protocol and the second management protocol.

7. The system of claim 6, wherein the third management protocol comprises a Global System for Mobile communication (GSM) Abis object oriented management protocol.

8. The system of claim 6, further comprising a public land mobile network (PLMN) gateway coupling the WARP and the OMC, the PLMN gateway operable to communicate with the WARP and the OMC.

9. The system of claim 8, further comprising an Internet Protocol (IP) network coupling the WARP and the PLMN gateway.

10. A management center for providing management protocol mediation between wireless networks comprising:
    an operations and maintenance center (OMC) operable to manage a first and second wireless networks, the OMC further operable to manage the first wireless network by executing an application using a first management protocol and to manage the second wireless network using a second management protocol, wherein the OMC is coupled to the second wireless network; and
    a protocol mediator coupled to the OMC and operable to translate between the first management protocol and the second management protocol.

11. The management center of claim 10, wherein the first management protocol comprises a Common Management Information Protocol management protocol.

12. The management center of claim 10, wherein the second management protocol comprises a Simple Network Management Protocol management protocol.

13. The management center of claim 10, wherein the protocol mediator is coupled to the OMC by a Telecommunications Network Management interface.

14. The management center of claim 10, further comprising a router coupled to the OMC and the protocol mediator, the router operable to transmit and receive management messages over an Internet Protocol (IP) network.

15. The management center of claim 14, wherein the OMC communicates with the protocol mediator through the router.

16. A method of providing management protocol mediation between wireless networks comprising the steps of:
executing at a first wireless network an application in an operations and maintenance center (OMC) coupled to a second wireless network using a first management protocol;
managing by the OMC the second wireless network using the second management protocol; and
translating between the first management protocol associated with the first wireless network and the second management protocol associated with the second wireless network.

17. The method of claim 16, wherein the first management protocol comprises a Common Management Information Protocol management protocol.

18. The method of claim 16, wherein the second management protocol comprises a Simple Network Management Protocol management protocol.

19. The method of claim 16, wherein the step of translating between the management protocols comprises:
mapping an instruction supported by the first protocol to an equivalent instruction supported by the second protocol;
mapping a parameter supported by the first protocol to an equivalent parameter supported by the second protocol; and
composing a message supported by the second protocol using the equivalent instruction and the equivalent parameter.

20. A method of providing management protocol mediation between wireless networks comprising the steps of:
executing at a first wireless network an application in an operations and maintenance center (OMC) using a first management protocol;
managing by the OMC a second wireless network using a second management protocol; and
translating between the first management protocol associated with the first wireless network and the second management protocol associated with the second wireless network;
managing a base station in the second wireless network using a third management protocol; and
translating between the second and third management protocols.

21. A system for providing management protocol mediation between wireless networks comprising:
a first wireless network operable to communicate with a mobile station over a wireless interface and comprising:
a base station operable to communicate with the mobile station over the wireless interface; and
a wireless adjunct internet platform (WARP) coupled to the base station and operable to communicate with the mobile station through the base station, wherein the WARP is operable to manage the base station using a third management protocol, the WARP comprising a mediation function operable to translate between a first management protocol and the third management protocol, wherein the third management protocol comprises a Global System for Mobile communication (GSM) Abis object oriented management protocol;
a second wireless network having an operations and maintenance center (OMC) coupled thereto and operable to execute an application to manage the second wireless network using a second management protocol, the OMC further operable to manage the first wireless network using the first management protocol, wherein the first management protocol comprises a Simple Network Management Protocol management protocol, wherein the second management protocol comprises a Common Management Information Protocol management protocol;
a protocol mediator coupled to the first and second wireless networks, the protocol mediator operable to translate between the first management protocol and the second management protocol, wherein the protocol mediator is coupled to the OMC by a first Telecommunications Network Management interface, and the protocol mediator is coupled to the first wireless network by a second Telecommunications Network Management interface;
a public land mobile network (PLMN) gateway coupling the WARP and the OMC, the PLMN gateway operable to communicate with the WARP and the OMC;
an Internet Protocol (IP) network coupling the WARP and the PLMN gateway; and
a public exchange (PBX) network coupled to the OMC and the IP network.

* * * * *